(12) United States Patent
Lesso

(10) Patent No.: US 11,694,695 B2
(45) Date of Patent: *Jul. 4, 2023

(54) SPEAKER IDENTIFICATION

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/540,600

(22) Filed: Dec. 2, 2021

(65) Prior Publication Data

US 2022/0093108 A1  Mar. 24, 2022

Related U.S. Application Data

(63) Continuation of application No. 15/877,660, filed on Jan. 23, 2018, now Pat. No. 11,264,037.

(51) Int. Cl.
*G10L 17/00* (2013.01)
*G10L 17/10* (2013.01)
(Continued)

(52) U.S. Cl.
CPC .............. *G10L 17/10* (2013.01); *G10L 15/08* (2013.01); *G10L 17/02* (2013.01); *G10L 17/06* (2013.01);
(Continued)

(58) Field of Classification Search
CPC ......... G10L 17/00; G10L 15/20; G10L 15/22; G10L 17/04; G10L 15/26; G10L 17/24;
(Continued)

(56) References Cited

U.S. PATENT DOCUMENTS 5,197,113 A   3/1993  Mumolo
5,568,559 A  10/1996  Makino
(Continued)

FOREIGN PATENT DOCUMENTS

AU   2015202397 B2   5/2015
CN      1497970 A    5/2004
(Continued)

OTHER PUBLICATIONS

Combined Search and Examination Report under Sections 17 and 18(3), UKIPO, Application No. GB2114337.5, dated Nov. 3, 2021.
(Continued)

*Primary Examiner* — Olujimi A Adesanya

(74) *Attorney, Agent, or Firm* — Jackson Walker L.L.P.

(57) ABSTRACT

A method of speaker identification comprises receiving an audio signal representing speech; performing a first voice biometric process on the audio signal to attempt to identify whether the speech is the speech of an enrolled speaker; and, if the first voice biometric process makes an initial determination that the speech is the speech of an enrolled user, performing a second voice biometric process on the audio signal to attempt to identify whether the speech is the speech of the enrolled speaker. The second voice biometric process is selected to be more discriminative than the first voice biometric process.

20 Claims, 8 Drawing Sheets

(51) Int. Cl.
  *G10L 17/22* (2013.01)
  *G10L 17/02* (2013.01)
  *G10L 15/08* (2006.01)
  *G10L 17/18* (2013.01)
  *G10L 17/06* (2013.01)

(52) U.S. Cl.
  CPC ............. *G10L 17/18* (2013.01); *G10L 17/22* (2013.01); *G10L 2015/088* (2013.01)

(58) Field of Classification Search
  CPC ......... G10L 2015/088; G10L 2015/223; G06F 3/167
  See application file for complete search history.

(56) References Cited

U.S. PATENT DOCUMENTS

| | | |
|---|---|---|
| 5,710,866 A | 1/1998 | Alleva et al. |
| 5,787,187 A | 7/1998 | Bouchard et al. |
| 5,838,515 A | 11/1998 | Mortazavi et al. |
| 6,182,037 B1 | 1/2001 | Maes |
| 6,229,880 B1 | 5/2001 | Reformato et al. |
| 6,249,237 B1 | 6/2001 | Prater |
| 6,343,269 B1 | 1/2002 | Harada et al. |
| 6,480,825 B1 | 11/2002 | Sharma et al. |
| 7,016,833 B2 | 3/2006 | Gable et al. |
| 7,039,951 B1 | 5/2006 | Chaudhari et al. |
| 7,418,392 B1 | 8/2008 | Mozer et al. |
| 7,492,913 B2 | 2/2009 | Connor et al. |
| 8,442,824 B2 | 5/2013 | Aley-Raz et al. |
| 8,489,399 B2 | 7/2013 | Gross |
| 8,577,046 B2 | 11/2013 | Aoyagi |
| 8,856,541 B1 | 10/2014 | Chaudhury et al. |
| 8,997,191 B1 | 3/2015 | Stark et al. |
| 9,049,983 B1 | 6/2015 | Baldwin |
| 9,171,548 B2 | 10/2015 | Valius et al. |
| 9,305,155 B1 | 4/2016 | Vo et al. |
| 9,317,736 B1 | 4/2016 | Siddiqui |
| 9,390,726 B1 | 7/2016 | Smus et al. |
| 9,430,629 B1 | 8/2016 | Ziraknejad et al. |
| 9,484,036 B2 | 11/2016 | Kons et al. |
| 9,548,979 B1 | 1/2017 | Johnson et al. |
| 9,600,064 B2 | 3/2017 | Lee et al. |
| 9,613,640 B1 | 4/2017 | Balamurali et al. |
| 9,641,585 B2 | 5/2017 | Kvaal et al. |
| 9,646,261 B2 | 5/2017 | Agrafioli et al. |
| 9,659,562 B2 | 5/2017 | Lovitt |
| 9,665,784 B2 | 5/2017 | Derakhshani et al. |
| 9,706,304 B1 | 7/2017 | Kelso et al. |
| 9,865,253 B1 | 1/2018 | De Leon et al. |
| 9,984,314 B2 | 5/2018 | Philipose et al. |
| 9,990,926 B1 | 6/2018 | Pearce |
| 10,032,451 B1 | 7/2018 | Mamkina et al. |
| 10,063,542 B1 | 8/2018 | Kao |
| 10,079,024 B1 | 9/2018 | Bhimanaik et al. |
| 10,097,914 B2 | 10/2018 | Petrank |
| 10,192,553 B1 | 1/2019 | Chenier et al. |
| 10,204,625 B2 | 2/2019 | Mishra et al. |
| 10,210,685 B2 | 2/2019 | Borgmeyer |
| 10,255,922 B1 | 4/2019 | Sharifi et al. |
| 10,277,581 B2 | 4/2019 | Chandrasekharan et al. |
| 10,305,895 B2 | 5/2019 | Barry et al. |
| 10,318,580 B2 | 6/2019 | Topchy et al. |
| 10,334,350 B2 | 6/2019 | Petrank |
| 10,339,290 B2 | 7/2019 | Valendi et al. |
| 10,460,095 B2 | 10/2019 | Boesen |
| 10,467,509 B2 | 11/2019 | Albadawi et al. |
| 10,692,492 B2 | 6/2020 | Rozen et al. |
| 10,733,987 B1 | 8/2020 | Govender et al. |
| 10,847,165 B2 | 11/2020 | Lesso |
| 10,915,614 B2 | 2/2021 | Lesso |
| 10,977,349 B2 | 4/2021 | Suh et al. |
| 11,017,252 B2 | 5/2021 | Lesso |
| 11,023,755 B2 | 6/2021 | Lesso |
| 11,037,574 B2 | 6/2021 | Lesso |
| 11,051,117 B2 | 6/2021 | Lesso |
| 11,164,588 B2 | 11/2021 | Monso et al. |
| 11,276,409 B2 | 3/2022 | Lesso |
| 2002/0169608 A1 | 11/2002 | Tamir et al. |
| 2002/0194003 A1 | 12/2002 | Mozer |
| 2003/0033145 A1 | 2/2003 | Petrushin |
| 2003/0177006 A1 | 9/2003 | Ichikawa et al. |
| 2003/0177007 A1 | 9/2003 | Kanazawa et al. |
| 2003/0182119 A1 | 9/2003 | Junqua et al. |
| 2004/0030550 A1 | 2/2004 | Liu |
| 2004/0141418 A1 | 7/2004 | Matsuo et al. |
| 2004/0230432 A1 | 11/2004 | Liu et al. |
| 2005/0060153 A1 | 3/2005 | Gable et al. |
| 2005/0107130 A1 | 5/2005 | Peterson, II |
| 2005/0171774 A1 | 8/2005 | Applebaum et al. |
| 2006/0116874 A1 | 6/2006 | Samuelsson et al. |
| 2006/0171571 A1 | 8/2006 | Chan et al. |
| 2007/0055517 A1 | 3/2007 | Spector |
| 2007/0124599 A1* | 5/2007 | Morita .................. B60R 25/255 726/19 |
| 2007/0129941 A1 | 6/2007 | Tavares |
| 2007/0185718 A1 | 8/2007 | Di Mambro et al. |
| 2007/0233483 A1 | 10/2007 | Kuppuswamy et al. |
| 2007/0250920 A1 | 10/2007 | Lindsay |
| 2007/0276658 A1 | 11/2007 | Douglass |
| 2008/0040615 A1* | 2/2008 | Carper .................... G06F 21/32 713/186 |
| 2008/0071532 A1 | 3/2008 | Ramakrishnan et al. |
| 2008/0082510 A1 | 4/2008 | Wang et al. |
| 2008/0223646 A1 | 9/2008 | White |
| 2008/0262382 A1 | 10/2008 | Akkermans et al. |
| 2008/0285813 A1 | 11/2008 | Holm |
| 2009/0087003 A1 | 4/2009 | Zurek et al. |
| 2009/0105548 A1 | 4/2009 | Bart |
| 2009/0167307 A1 | 7/2009 | Kopp |
| 2009/0232361 A1 | 9/2009 | Miller |
| 2009/0281809 A1 | 11/2009 | Reuss |
| 2009/0319270 A1 | 12/2009 | Gross |
| 2010/0004934 A1 | 1/2010 | Hirose et al. |
| 2010/0076770 A1 | 3/2010 | Ramaswamy |
| 2010/0106502 A1 | 4/2010 | Farrell et al. |
| 2010/0106503 A1 | 4/2010 | Farrell et al. |
| 2010/0204991 A1 | 8/2010 | Ramakrishnan et al. |
| 2010/0328033 A1 | 12/2010 | Kamei |
| 2011/0051907 A1 | 3/2011 | Jaiswal et al. |
| 2011/0075857 A1 | 3/2011 | Aoyagi |
| 2011/0142268 A1 | 6/2011 | Iwakuni et al. |
| 2011/0246198 A1 | 10/2011 | Asenjo et al. |
| 2011/0276323 A1 | 11/2011 | Seyfetdinov |
| 2011/0314530 A1 | 12/2011 | Donaldson |
| 2011/0317848 A1 | 12/2011 | Ivanov et al. |
| 2012/0110341 A1 | 5/2012 | Beigi |
| 2012/0223130 A1 | 9/2012 | Knopp et al. |
| 2012/0224456 A1 | 9/2012 | Visser et al. |
| 2012/0249328 A1 | 10/2012 | Xiong |
| 2012/0323796 A1 | 12/2012 | Udani |
| 2013/0024191 A1 | 1/2013 | Krutsch et al. |
| 2013/0058488 A1 | 3/2013 | Cheng et al. |
| 2013/0080167 A1 | 3/2013 | Mozer |
| 2013/0132091 A1 | 5/2013 | Skerpac |
| 2013/0225128 A1 | 8/2013 | Gomar |
| 2013/0227678 A1 | 8/2013 | Kang |
| 2013/0247082 A1 | 9/2013 | Wang et al. |
| 2013/0279297 A1 | 10/2013 | Wulff et al. |
| 2013/0279724 A1 | 10/2013 | Stafford et al. |
| 2013/0289999 A1 | 10/2013 | Hymel |
| 2014/0012596 A1* | 1/2014 | Kim ....................... G06F 21/32 705/3 |
| 2014/0059347 A1 | 2/2014 | Dougherty et al. |
| 2014/0149117 A1 | 5/2014 | Bakish et al. |
| 2014/0172430 A1 | 6/2014 | Rutherford et al. |
| 2014/0188770 A1 | 7/2014 | Agrafioti et al. |
| 2014/0237576 A1 | 8/2014 | Zhang et al. |
| 2014/0241597 A1 | 8/2014 | Leite |
| 2014/0293749 A1 | 10/2014 | Gervaise |
| 2014/0307876 A1 | 10/2014 | Agiomyrgiannakis et al. |
| 2014/0330568 A1 | 11/2014 | Lewis et al. |
| 2014/0337945 A1 | 11/2014 | Jia et al. |
| 2014/0343703 A1 | 11/2014 | Topchy et al. |

(56) References Cited

U.S. PATENT DOCUMENTS

| | | |
|---|---|---|
| 2014/0358353 A1* | 12/2014 | Ibanez-Guzman .................... B60W 60/0025 701/23 |
| 2014/0358535 A1* | 12/2014 | Lee ........................ G10L 17/22 704/233 |
| 2015/0006163 A1 | 1/2015 | Liu et al. |
| 2015/0028996 A1 | 1/2015 | Agrafioti et al. |
| 2015/0033305 A1 | 1/2015 | Shear et al. |
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 | 6/2015 | North et al. |
| 2015/0161459 A1 | 6/2015 | Boczek |
| 2015/0168996 A1 | 6/2015 | Sharpe et al. |
| 2015/0245154 A1 | 8/2015 | Dadu et al. |
| 2015/0261944 A1 | 9/2015 | Hosom et al. |
| 2015/0276254 A1 | 10/2015 | Nemcel et al. |
| 2015/0301796 A1 | 10/2015 | Visser et al. |
| 2015/0332665 A1 | 11/2015 | Mishra et al. |
| 2015/0347734 A1 | 12/2015 | Beigi |
| 2015/0356974 A1 | 12/2015 | Tani et al. |
| 2015/0371639 A1 | 12/2015 | Foerster et al. |
| 2016/0007118 A1 | 1/2016 | Lee et al. |
| 2016/0026781 A1 | 1/2016 | Boczek |
| 2016/0066113 A1 | 3/2016 | Elkhatib et al. |
| 2016/0071516 A1 | 3/2016 | Lee et al. |
| 2016/0086607 A1 | 3/2016 | Aley-Raz et al. |
| 2016/0086609 A1 | 3/2016 | Yue et al. |
| 2016/0111112 A1 | 4/2016 | Hayakawa |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0148012 A1 | 5/2016 | Khitrov et al. |
| 2016/0182998 A1 | 6/2016 | Galal et al. |
| 2016/0210407 A1 | 7/2016 | Hwang et al. |
| 2016/0217321 A1 | 7/2016 | Gottleib |
| 2016/0217795 A1 | 7/2016 | Lee et al. |
| 2016/0234204 A1 | 8/2016 | Rishi et al. |
| 2016/0248768 A1 | 8/2016 | McLaren et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2016/0372139 A1 | 12/2016 | Cho et al. |
| 2017/0011406 A1 | 1/2017 | Tunnell et al. |
| 2017/0049335 A1 | 2/2017 | Duddy |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1 | 4/2017 | Goldstein |
| 2017/0116995 A1 | 4/2017 | Ady et al. |
| 2017/0134377 A1 | 5/2017 | Tokunaga et al. |
| 2017/0150254 A1 | 5/2017 | Bakish et al. |
| 2017/0161482 A1 | 6/2017 | Eltoft et al. |
| 2017/0162198 A1 | 6/2017 | Chakladar et al. |
| 2017/0169828 A1 | 6/2017 | Sachdev |
| 2017/0200451 A1 | 7/2017 | Booklet et al. |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0242990 A1 | 8/2017 | Chien |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0293749 A1* | 10/2017 | Baek ........................ G06V 40/12 |
| 2017/0323644 A1 | 11/2017 | Kawato |
| 2017/0347180 A1 | 11/2017 | Petrank |
| 2017/0347348 A1 | 11/2017 | Masaki et al. |
| 2017/0351487 A1 | 12/2017 | Aviles-Casco Vaquero et al. |
| 2017/0373655 A1 | 12/2017 | Mengad et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060552 A1 | 3/2018 | Pellom et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0330727 A1* | 11/2018 | Tulli ........................ G10L 15/22 |
| 2018/0336716 A1 | 11/2018 | Ramprashad et al. |
| 2018/0336901 A1 | 11/2018 | Masaki et al. |
| 2018/0342237 A1 | 11/2018 | Lee et al. |
| 2018/0349585 A1 | 12/2018 | Ahn et al. |
| 2018/0352332 A1 | 12/2018 | Tao |
| 2018/0357470 A1 | 12/2018 | Yang et al. |
| 2018/0358020 A1 | 12/2018 | Chen et al. |
| 2018/0366124 A1 | 12/2018 | Cilingir et al. |
| 2018/0374487 A1 | 12/2018 | Lesso |
| 2018/0376234 A1 | 12/2018 | Petrank |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0043512 A1 | 2/2019 | Huang et al. |
| 2019/0065478 A1 | 2/2019 | Tsujikawa et al. |
| 2019/0098003 A1 | 3/2019 | Ota |
| 2019/0103115 A1 | 4/2019 | Lesso |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0122670 A1 | 4/2019 | Roberts et al. |
| 2019/0147888 A1 | 5/2019 | Lesso |
| 2019/0149920 A1 | 5/2019 | Putzeys et al. |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0287536 A1 | 9/2019 | Sharifi et al. |
| 2019/0294629 A1 | 9/2019 | Wexler et al. |
| 2019/0295554 A1 | 9/2019 | Lesso |
| 2019/0304470 A1 | 10/2019 | Ghaemmaghami et al. |
| 2019/0306594 A1 | 10/2019 | Aumer et al. |
| 2019/0306613 A1 | 10/2019 | Qian et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0372969 A1 | 12/2019 | Chang et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |
| 2020/0184057 A1 | 6/2020 | Mukund |

(56) References Cited

U.S. PATENT DOCUMENTS

| | | |
|---|---|---|
| 2020/0204937 A1 | 6/2020 | Lesso |
| 2020/0227071 A1 | 7/2020 | Lesso |
| 2020/0265834 A1 | 8/2020 | Lesso et al. |
| 2020/0286492 A1 | 9/2020 | Lesso |
| 2021/0303669 A1 | 9/2021 | Lesso |
| 2021/0304775 A1 | 9/2021 | van den Berg |

FOREIGN PATENT DOCUMENTS

| | | |
|---|---|---|
| CN | 1937955 A | 3/2007 |
| CN | 101228787 A | 7/2008 |
| CN | 101578637 A | 11/2009 |
| CN | 102246228 A | 11/2011 |
| CN | 103109495 A | 5/2013 |
| CN | 103477604 A | 12/2013 |
| CN | 104038625 A | 9/2014 |
| CN | 104252860 A | 12/2014 |
| CN | 104956715 A | 9/2015 |
| CN | 105185380 A | 12/2015 |
| CN | 105244031 A | 1/2016 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| CN | 106537889 A | 3/2017 |
| CN | 107251573 A | 10/2017 |
| EP | 1205884 A2 | 5/2002 |
| EP | 1600791 A1 | 11/2005 |
| EP | 1701587 A1 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| EP | 3466106 A1 | 4/2019 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| TW | 200820218 A | 5/2008 |
| WO | 9834216 A2 | 8/1998 |
| WO | 0208147 A1 | 10/2002 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |
| WO | 2019002831 A1 | 1/2019 |
| WO | 2019008387 A1 | 1/2019 |
| WO | 2019008389 A1 | 1/2019 |
| WO | 2019008392 A1 | 1/2019 |

OTHER PUBLICATIONS

Wu, Libing, et al., LVID: A Multimodal Biometricas Authentication System on Smartphones, IEEE Transactions on Information Forensics and Security, Vo. 15, 2020, pp. 1572-1585.

Wang, Qian, et al., VoicePop: A Pop Noise based Anti-spoofing System for Voice Authentication on Smartphones, IEEE Infocom 2019—IEEE Conference on Computer Communications, Apr. 29-May 2, 2019, pp. 2062-2070.

Examination Report under Section 18(3), UKIPO, Application No. GB1918956.2, dated Jul. 29, 2021.

Examination Report under Section 18(3), UKIPO, Application No. GB1918965.3, dated Aug. 2, 2021.

Combined Search and Examination Report under Sections 17 and 18(3), UKIPO, Application No. GB2105613.0, dated Sep. 27, 2021.

International Search Report and Written Opinion of the International Searching Authority, International Application No. PCT/GB2019/052302, dated Oct. 2, 2019.

Liu, Yuan et al., "Speaker verification with deep features", Jul. 2014, in International Joint Conference on Neural networks (IJCNN), pp. 747-753, IEEE.

International Search Report and Written Opinion of the International Searching Authority, International Application No. PCT/GB2018/051927, dated Sep. 25, 2018.

Combined Search and Examination Report under Sections 17 and 18(3), UKIPO, Application No. 1801530.5, dated Jul. 25, 2018.

International Search Report and Written Opinion of the International Searching Authority, International Application No. PCT/GB2018/051924, dated Sep. 26, 2018.

Combined Search and Examination Report under Sections 17 and 18(3), UKIPO, Application No. 1801526.3, dated Jul. 25, 2018.

International Search Report and Written Opinion of the International Searching Authority, International Application No. PCT/GB2018/051931, dated Sep. 27, 2018.

Combined Search and Examination Report under Sections 17 and 18(3), UKIPO, Application No. 1801527.1, dated Jul. 25, 2018.

International Search Report and Written Opinion of the International Searching Authority, International Application No. PCT/GB2018/051925, dated Sep. 26, 2018.

Combined Search and Examination Report under Sections 17 and 18(3), UKIPO, Application No. 1801528.9, dated Jul. 25, 2018.

International Search Report and Written Opinion of the International Searching Authority, International Application No. PCT/GB2018/051928, dated Dec. 3, 2018.

Combined Search and Examination Report under Sections 17 and 18(3), UKIPO, Application No. 1801532.1, dated Jul. 25, 2018.

Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.

International Search Report and Written Opinion of the International Searching Authority, International Application No. PCT/GB2018/053274, dated Jan. 24, 2019.

Beigi, Homayoon, "Fundamentals of Speaker Recognition," Chapters 8-10, ISBN: 978-0-378-77592-0; 2011.

Li, Lantian et al., "A Study on Replay Attack and Anti-Spoofing for Automatic Speaker Verification", Interspeech 2017, Jan. 1, 2017, pp. 92-96.

Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.

Partial International Search Report of the International Searching Authority, International Application No. PCT/GB2018/052905, dated Jan. 25, 2019.

Further Search Report under Sections 17 (6), UKIPO, Application No. GB1719731.0, dated Nov. 26, 2018.

Combined Search and Examination Report, UKIPO, Application No. GB1713695.3, dated Feb. 19, 2018.

Zhang et al., An Investigation of Deep-Learing Frameworks for Speaker Verification Antispoofing—IEEE Journal of Selected Topics in Signal Processes, Jun. 1, 2017.

Combined Search and Examination Report under Sections 17 and 18(3), UKIPO, Application No. GB1804843.9, dated Sep. 27, 2018.

Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.

(56) References Cited

OTHER PUBLICATIONS

Combined Search and Examination Report under Sections 17 and 18(3), UKIPO, Application No. GB1803570.9, dated Aug. 21, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801664.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
International Search Report and Written Opinion of the International Searching Authority, International Application No. PCT/GB2019/050185, dated Apr. 2, 2019.
Combined Search and Examination Report under Sections 17 and 18(3), UKIPO, Application No. GB1809474.8, dated Jul. 23, 2018.
Ajmera, et al,, "Robust Speaker Change Detection," IEEE Signal Processing Letters, vol. 1, No. 8, pp. 649-651, Aug. 2004.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
Villalba, Jesus et al., Preventing Replay Attacks on Speaker Verification Systems, International Carnahan Conference On Security Technology (ICCST), 2011 IEEE, Oct. 18, 2011, pp. 1-8.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: Jun. 5, 2017.
International Search Report and Written Opinion of the International Searching Authority, International Application No. PCT/GB2018/052907, dated Jan. 15, 2019.
Combined Search and Examination Report under Sections 17 and 18(3), UKIPO, Application No. GB1713699.5, dated Feb. 21, 2018.
International Search Report and Written Opinion of the International Searching Authority, International Application No. PCT/GB2019/052143, dated Sep. 17, 2019.
Lucas, Jim, What Is Electromagnetic Radiation? Live Science, Mar. 13, 2015, NY, NY.
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inaudiable voice commands allow attackers to control Siri, Alexa and other digital assistants, Sep. 2017.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, HERTS., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Toth, Arthur R., et al., Synthesizing Speech from Doppler Signals, ICASSP 2010, IEEE, pp. 4638-4641.
Boesen, U.S. Appl. No. 62/403,045, filed Sep. 30, 2017.
Meng, Y. et al., "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
Combined Search and Examination Report under Sections 17 and 18(3), UKIPO, Application No. GB2112228.8, dated May 17, 2022.
Search Report under Section 17, UKIPO, Application No. GB2202521.7, dated Jun. 21, 2022.
Combined Search and Examination Report under Sections 17 and 18(3), UKIPO, Application No. GB2210986.2, dated Nov. 15, 2022.
Search Report, China National Intellectual Property Administration, Application No. 201800658351, dated Feb. 2, 2023.
First Office Action, China National Intellectual Property Administration, Application No. 201800658351, dated Feb. 4, 2023.
First Office Action, China National Intellectual Property Administration, Patent Application No. 2018800452077, dated Feb. 25, 2023.
First Office Action, China National Intellectual Property Administration, Patent Application No. 2018800452787, dated Mar. 14, 2023.
First Office Action, China National Intellectual Property Administration, Patent Application No. 2018800419187, dated Feb. 28, 2023.
Notice of Preliminary Rejection, Korean Intellectual Property Office, Patent Application No. 10-2020-7002065, dated Apr. 17, 2023.
Notice of Preliminary Rejection, Korean Intellectual Property Office, Patent Application No. 10-2020-7002061, dated Apr. 27, 2023.

\* cited by examiner

SPEAKER IDENTIFICATION

The present disclosure is a continuation of U.S. Non-Provisional patent application Ser. No. 15/877,660, filed Jan. 23, 2018, which is incorporated by reference herein in its entirety.

TECHNICAL FIELD

Embodiments described herein relate to methods and devices for analysing speech signals.

BACKGROUND

Many devices include microphones, which can be used to detect ambient sounds. In many situations, the ambient sounds include the speech of one or more nearby speaker. Audio signals generated by the microphones can be used in many ways. For example, audio signals representing speech can be used as the input to a speech recognition system, allowing a user to control a device or system using spoken commands.

SUMMARY

According to an aspect of the invention, there is provided a method of speaker identification, comprising:
  receiving an audio signal representing speech;
  performing a first voice biometric process on the audio signal to attempt to identify whether the speech is the speech of an enrolled speaker; and
  if the first voice biometric process makes an initial determination that the speech is the speech of an enrolled user, performing a second voice biometric process on the audio signal to attempt to identify whether the speech is the speech of the enrolled speaker,
  wherein the second voice biometric process is selected to be more discriminative than the first voice biometric process.

In some embodiments, the second voice biometric process is configured to have a lower False Acceptance Rate than the first voice biometric process.

In some embodiments, the second voice biometric process is configured to have a lower False Rejection Rate than the first voice biometric process.

In some embodiments, the second voice biometric process is configured to have a lower Equal Error Rate than the first voice biometric process.

In some embodiments, the first voice biometric process is selected as a relatively low power process compared to the second voice biometric process.

In some embodiments, the method comprises making a decision as to whether the speech is the speech of the enrolled speaker, based on a result of the second voice biometric process.

In some embodiments, the method comprises making a decision as to whether the speech is the speech of the enrolled speaker, based on a fusion of a result of the first voice biometric process and a result of the second voice biometric process.

In some embodiments, the first voice biometric process is selected from the following: a process based on analysing a long-term spectrum of the speech; a method using a Gaussian Mixture Model; a method using Mel Frequency Cepstral Coefficients; a method using Principal Component Analysis; a method using machine learning techniques such as Deep Neural Nets (DNNs); and a method using a Support Vector Machine.

In some embodiments, the second voice biometric process is selected from the following: a neural net process; a Joint Factor Analysis process; a Tied Mixture of Factor Analyzers process; and an i-vector process.

In some embodiments, the first voice biometric process is performed in a first device and the second voice biometric process is performed in a second device remote from the first device.

In some embodiments, the method comprises maintaining the second voice biometric process in a low power state, and activating the second voice biometric process if the first voice biometric process makes an initial determination that the speech is the speech of an enrolled user.

In some embodiments, the method comprises activating the second voice biometric process in response to an initial determination based on a partial completion of the first voice biometric process that the speech might be the speech of an enrolled user, and deactivating the second voice biometric process in response to a determination based on a completion of the first voice biometric process that the speech is not the speech of the enrolled user.

In some embodiments, the method comprises:
  detecting a trigger phrase in the received audio signal; and
  responsive to the detecting of a trigger phrase, performing the first voice biometric process on the received audio signal.

In some embodiments, the method comprises:
  detecting voice activity in the received audio signal; and
  responsive to the detecting of voice activity, performing the first voice biometric process on at least a part of the received audio signal.

In some embodiments, the method comprises:
  detecting voice activity in the received audio signal;
  responsive to the detecting of voice activity, performing keyword detection; and
  responsive to detecting a keyword, performing the first voice biometric process on at least a part of the received audio signal.

In some embodiments, the method comprises:
  performing the first voice biometric process on the entire received audio signal.

In some embodiments, the method comprises using an initial determination by the first voice biometric process, that the speech is the speech of an enrolled user, as an indication that the received audio signal comprises speech.

In some embodiments, the method comprises:
  performing at least a part of a voice biometric process suitable for determining whether a signal contains speech of an enrolled user, and generating an output signal when it is determined that the signal contains human speech.

In some embodiments, the method comprises comparing a similarity score with a first threshold to determine whether the signal contains speech of an enrolled user, and comparing the similarity score with a second, lower, threshold to determine whether the signal contains speech.

In some embodiments, the method comprises determining that the signal contains human speech before it is possible to determine whether the signal contains speech of an enrolled user.

In some embodiments, the first voice biometric process is configured as an analog processing system, and the second voice biometric process is configured as a digital processing system.

According to one aspect, there is provided a speaker identification system, comprising:
- an input for receiving an audio signal representing speech;
- a first processor for performing a first voice biometric process on the audio signal to attempt to identify whether the speech is the speech of an enrolled speaker; and
- a second processor for performing a second voice biometric process on the audio signal to attempt to identify whether the speech is the speech of the enrolled speaker,
- wherein the second voice biometric process is initiated if the first voice biometric process makes an initial determination that the speech is the speech of an enrolled user, and
- wherein the second voice biometric process is selected to be more discriminative than the first voice biometric process.

In some embodiments, the speaker identification system further comprises:
- a buffer, for storing the received audio signal, and for supplying the stored received audio signal to the second voice biometric process if the first voice biometric process makes an initial determination that the speech is the speech of an enrolled user.

In some embodiments, the second voice biometric process is configured to have a lower False Acceptance Rate than the first voice biometric process.

In some embodiments, the second voice biometric process is configured to have a lower False Rejection Rate than the first voice biometric process.

In some embodiments, the second voice biometric process is configured to have a lower Equal Error Rate than the first voice biometric process.

In some embodiments, the first voice biometric process is selected as a relatively low power process compared to the second voice biometric process.

In some embodiments, the speaker identification system is configured for making a decision as to whether the speech is the speech of the enrolled speaker, based on a result of the second voice biometric process.

In some embodiments, the speaker identification system is configured for making a decision as to whether the speech is the speech of the enrolled speaker, based on a fusion of a result of the first voice biometric process and a result of the second voice biometric process.

In some embodiments, the first voice biometric process is selected from the following: a process based on analysing a long-term spectrum of the speech; a method using a Gaussian Mixture Model; a method using Mel Frequency Cepstral Coefficients; a method using Principal Component Analysis; a method using machine learning techniques such as Deep Neural Nets (DNNs); and a method using a Support Vector Machine.

In some embodiments, the second voice biometric process is selected from the following: a neural net process; a Joint Factor Analysis process; a Tied Mixture of Factor Analyzers process; and an i-vector process.

In some embodiments, the speaker identification system comprises:
- a first device; and
- a second device,
- wherein the first device includes the first processor, and the second device includes the second processor.

In some embodiments, the first device comprises a first integrated circuit, and the second device comprises a second integrated circuit.

In some embodiments, the first device comprises a dedicated biometrics integrated circuit.

In some embodiments, the first device is an accessory device.

In some embodiments, the first device is a listening device.

In some embodiments, the second device comprises an applications processor.

In some embodiments, the second device is a handset device.

In some embodiments, the second device is a smartphone.

In some embodiments, the speaker identification system comprises:
- a trigger phrase detector for attempting to detect a trigger phrase in the received audio signal,
- wherein the first processor is responsive to the trigger phrase detector, and configured to perform the first voice biometric process on the received audio signal in response to detecting of a trigger phrase.

In some embodiments, the speaker identification system comprises:
- a voice activity detector for attempting to detect human speech in the received audio signal,
- wherein the first processor is responsive to the trigger phrase detector, and configured to perform the first voice biometric process on the received audio signal responsive to detecting of voice activity.

In some embodiments, the first processor is configured to receive the entire received audio signal for performing the first voice biometric process thereon.

In some embodiments, the first voice biometric process is configured as an analog processing system, and the second voice biometric process is configured as a digital processing system.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to an aspect, there is provided a processor integrated circuit for use in a speaker identification system, the processor integrated circuit comprising:
- an input for receiving an audio signal representing speech;
- a first processor for performing a first voice biometric process on the audio signal to attempt to identify whether the speech is the speech of an enrolled speaker; and
- an output, for providing the audio signal to a separate device if the first voice biometric process makes an initial determination that the speech is the speech of an enrolled user.

In some embodiments, the processor integrated circuit further comprises:
- a buffer, for storing the received audio signal, and for supplying the stored received audio signal to the output if the first voice biometric process makes an initial determination that the speech is the speech of an enrolled user.

In some embodiments, the first voice biometric process is selected from the following: a process based on analysing a long-term spectrum of the speech; a method using a Gaussian Mixture Model; a method using Mel Frequency Cepstral Coefficients; a method using Principal Component Analysis; a method using machine learning techniques such as Deep Neural Nets (DNNs); and a method using a Support Vector Machine.

In some embodiments, the first voice biometric process is configured as an analog processing system.

In some embodiments, the processor integrated circuit further comprises an anti-spoofing block, for performing one or more tests on the received signal to determine whether the received signal has properties that may indicate that it results from a replay attack.

According to an aspect, there is provided a processor integrated circuit for use in a speaker identification system, the processor integrated circuit comprising:
 an input for receiving an audio signal representing speech;
 a second processor for performing a second voice biometric process on the audio signal to attempt to identify whether the speech is the speech of the enrolled speaker, wherein the second voice biometric process is initiated if a first voice biometric process performed on a separate device makes an initial determination that the speech is the speech of an enrolled user, and
 wherein the second voice biometric process is selected to be more discriminative than the first voice biometric process.

In some embodiments, the processor integrated circuit comprises a decision block, for making a decision as to whether the speech is the speech of the enrolled speaker, based on a result of the second voice biometric process.

In some embodiments, the processor integrated circuit comprises a decision block, for making a decision as to whether the speech is the speech of the enrolled speaker, based on a fusion of a result of the first voice biometric process performed on the separate device and a result of the second voice biometric process.

In some embodiments, the second voice biometric process is selected from the following: a neural net process; a Joint Factor Analysis process; a Tied Mixture of Factor Analyzers process; and an i-vector process.

In some embodiments, the second device comprises an applications processor.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect.

According to another aspect of the present invention, there is provided a method of voice activity detection, the method comprising performing at least a part of a voice biometric process suitable for determining whether a signal contains speech of an enrolled user, and generating an output signal when it is determined that the signal contains human speech.

The method may comprise comparing a similarity score with a first threshold to determine whether the signal contains speech of an enrolled user, and comparing the similarity score with a second, lower, threshold to determine whether the signal contains speech.

The method may comprise determining that the signal contains human speech before it is possible to determine whether the signal contains speech of an enrolled user.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems. However, for ease of explanation of one embodiment, an illustrative example will be described, in which the implementation occurs in a smartphone.

Figure 1:
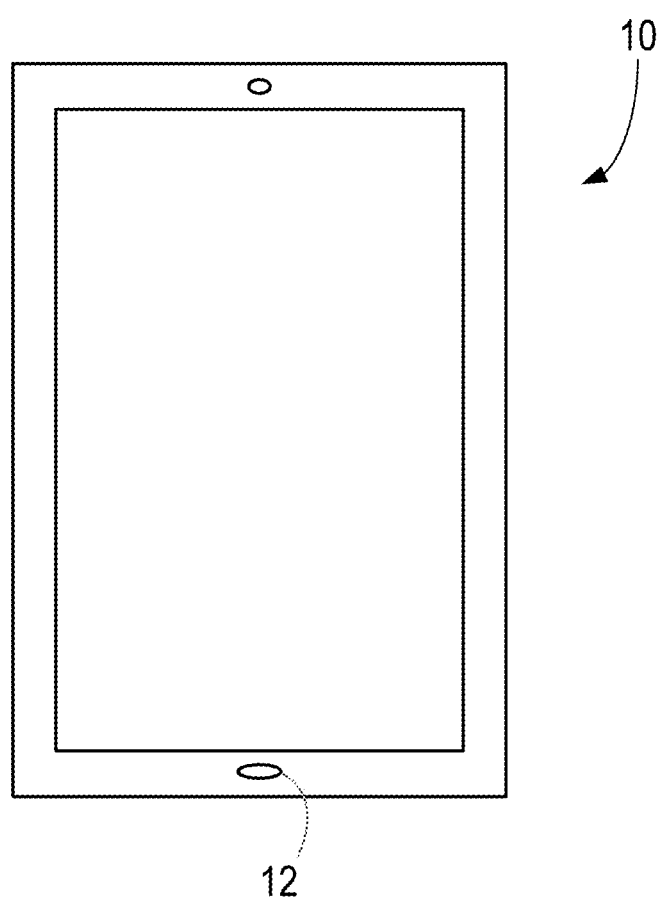
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10 close to their face.

Figure 2:
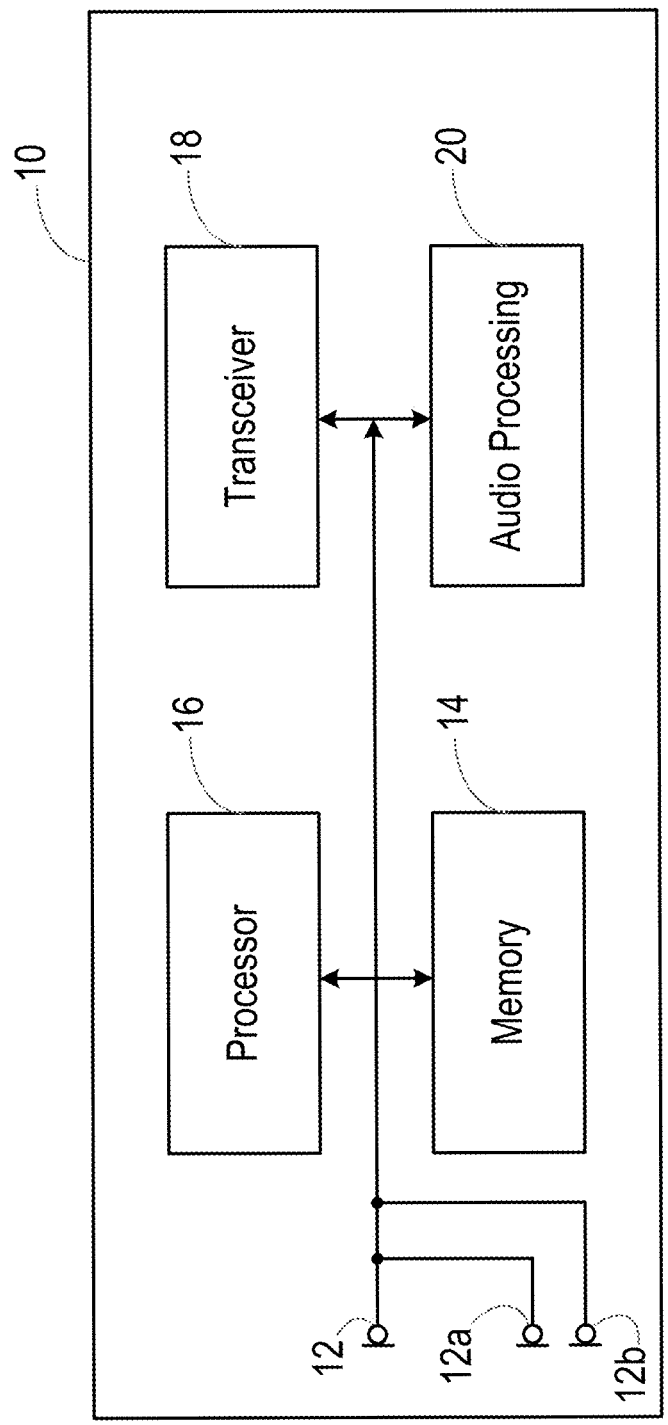
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

In other embodiments, a first part of the voice biometric functionality is performed on the smartphone 10 or other device that is located close to the user. Then, as described in more detail below, a signal may be transmitted using the transceiver 18 to a remote system, which performs a second part of the voice biometric functionality.

For example, the speech recognition system may be located on one or more remote server in a cloud computing environment. Signals based on the meaning of the spoken commands are then returned to the smartphone 10 or other local device.

Methods described herein proceed from the recognition that different parts of a user's speech have different properties.

Specifically, it is known that speech can be divided into voiced sounds and unvoiced or voiceless sounds. A voiced sound is one in which the vocal cords of the speaker vibrate, and a voiceless sound is one in which they do not.

It is now recognised that the voiced and unvoiced sounds have different frequency properties, and that these different frequency properties can be used to obtain useful information about the speech signal.

Figure 3:
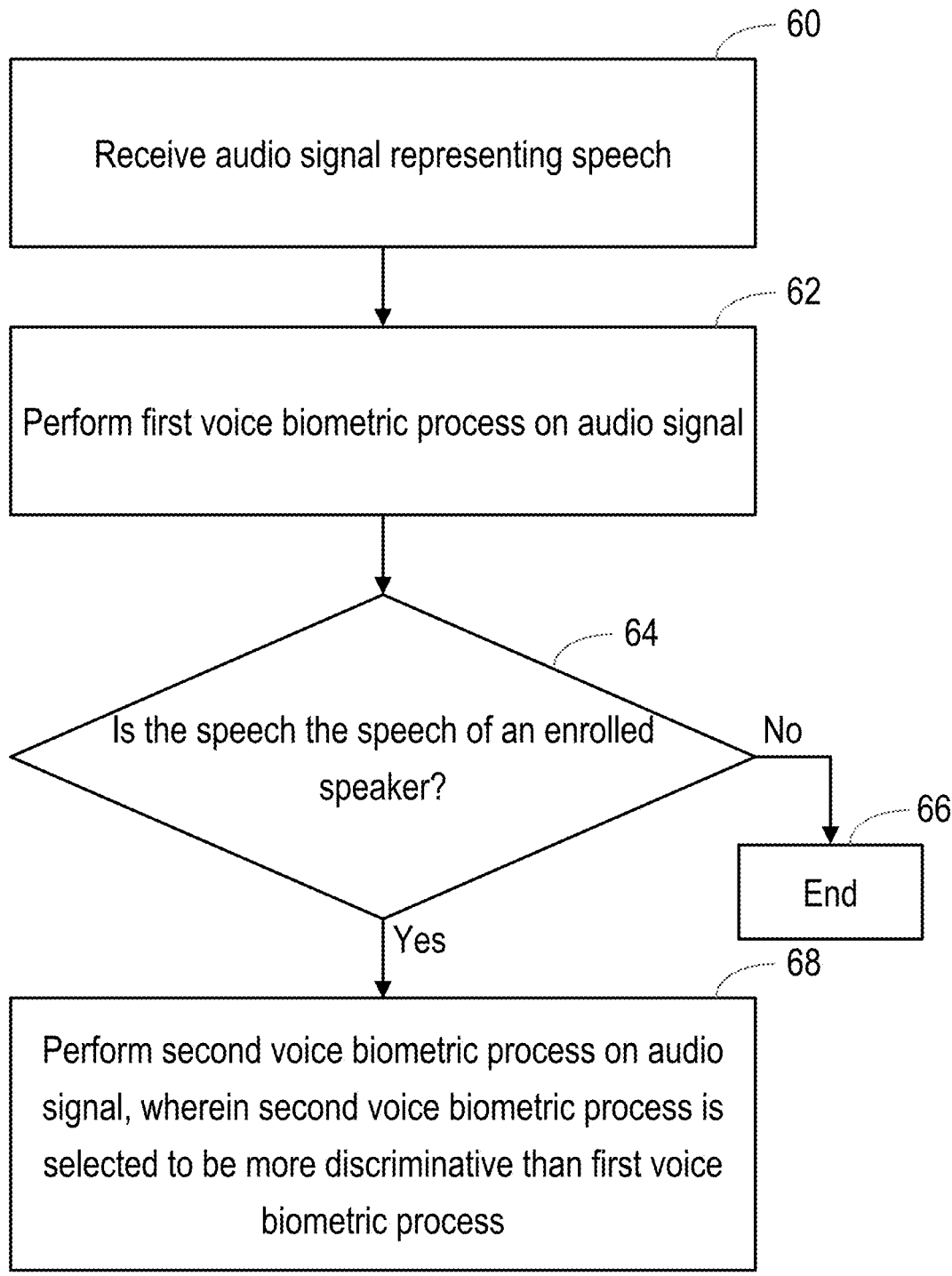
FIG. 3 is a flow chart illustrating a method of analysing an audio signal.
Figure 4:
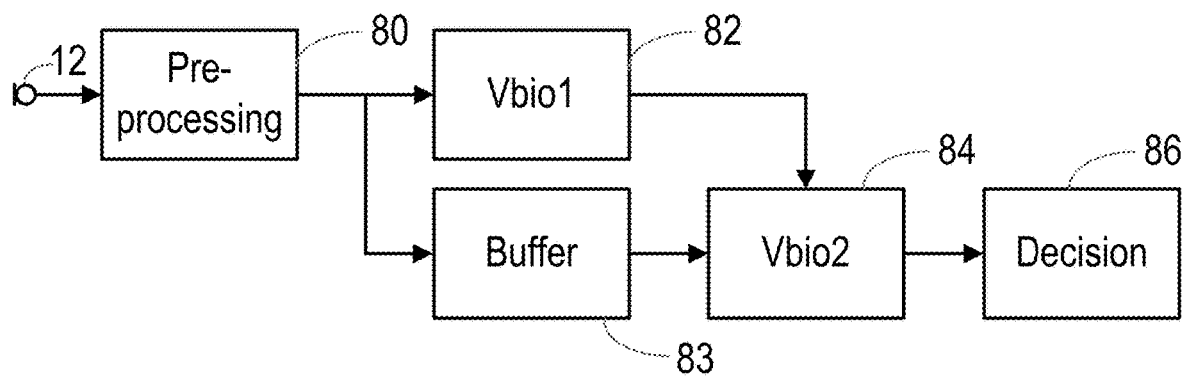
FIG. 4 is a block diagram illustrating a system for analysing an audio signal.
Figure 5:
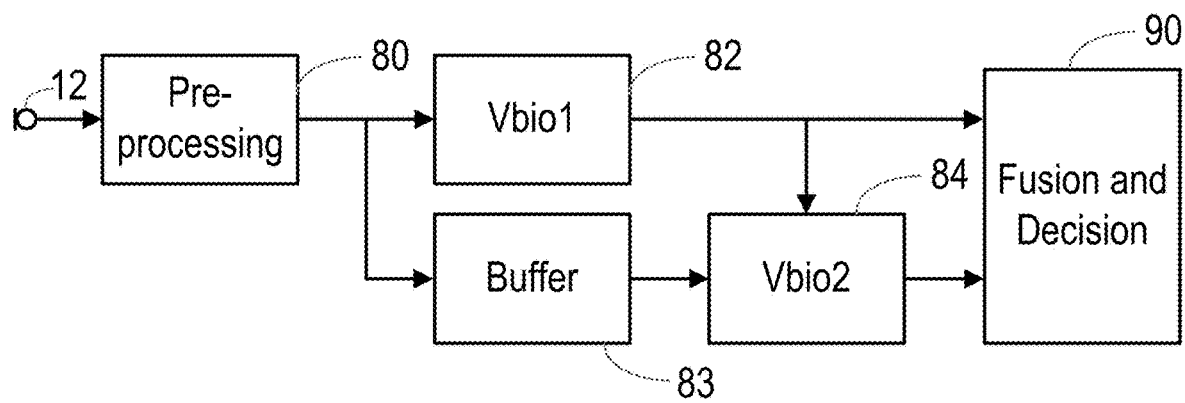
FIG. 5 is a block diagram illustrating an alternative system for analysing an audio signal.

FIG. 3 is a flow chart, illustrating a method of analysing an audio signal, and FIGS. 4 and 5 are block diagrams illustrating functional blocks in the analysis system.

Specifically, in step 60 in the method of FIG. 3, an audio signal, which is expected to contain speech, is generated by a microphone 12 of the system shown in FIGS. 4 and 5, in response to the detected sound.

The audio signal may for example be expected to contain the speech of a specific speaker, who has previously enrolled in the speaker recognition system. In that case, the aim of the method may be to determine whether the person speaking is indeed the enrolled speaker, in order to determine whether any commands that are spoken by that person should be acted upon.

The signal generated by the microphone 12 is passed to a pre-processing block 80. Typically, the signal received from the microphone 12 is an analog signal, and the pre-processing block 80 includes an analog-digital converter, for converting the signal into a digital form. Also in the pre-processing block 80, the received signal is divided into frames, which may for example have lengths in the range of 10-100 ms, and then passed to a voice activity detection block. Frames that are considered to contain speech are then output from the pre-processing block 80. In other embodiments, different acoustic classes of speech are considered. In that case, for example, frames that are considered to contain voiced speech are output from the pre-processing block 80.

In some cases, the speech processing system is a trigger-dependent system. In such cases, it is determined whether the detected speech contains a predetermined trigger phrase (such as "Hello phone", or the like) that the user must speak in order to wake the system out of a low-power mode. The frames that are considered to contain voiced speech are then output from the pre-processing block 80 only when that trigger phrase has been detected. Thus, in this case, there is a voice activity detection step; if voice activity is detected, a voice keyword detection (trigger phrase detection) process is initiated; and the audio signal is output from the pre-processing block 80 only if voice activity is detected and if the keyword (trigger phrase) is detected.

In other cases, the speech processing system does not rely on the use of a trigger phrase. In such cases, all frames that are considered to contain voiced speech are output from the pre-processing block 80.

The signal output from the pre-processing block 80 is passed to a first voice biometric block (Vbio1) 82 and, in step 62 of the process shown in FIG. 3, a first voice biometric process is performed on the audio signal. As is conventional for a voice biometric process, this attempts to identify, in step 64 of the process shown in FIG. 3, whether the speech is the speech of an enrolled speaker.

If the first voice biometric process performed in the first voice biometric block 82 determines that the speech is not the speech of the enrolled speaker, the process passes to step 66, and ends. Any speech thereafter may be disregarded, until such time as there is evidence that a different person has started speaking.

The signal output from the pre-processing block 80 is also passed to a buffer 83, the output of which is connected to a second voice biometric block (Vbio2) 84. If, in step 64 of the process shown in FIG. 3, the first voice biometric process has made a provisional or initial determination that the speech might be the speech of the enrolled speaker, the second voice biometric block 84 is activated.

Then, in step 68 of the process shown in FIG. 3, a second voice biometric process is performed on the audio signal that was stored in the buffer 83. Again, this second biometric process attempts to identify whether the speech is the speech of an enrolled speaker.

The second voice biometric process performed in step 68 is selected to be more discriminative than the first voice biometric process performed in step 62.

For example, the term "more discriminative" may mean that the second voice biometric process is configured to have a lower False Acceptance Rate (FAR), a lower False Rejection Rate (FRR), or a lower Equal Error Rate (EER) than the first voice biometric process.

Thus, the first voice biometric process may be selected as a relatively low power, and/or less computationally expensive, process, compared to the second voice biometric process. This means that the first voice biometric process can be running on all detected speech, while the higher power and/or more computationally expensive second voice biometric process can be maintained in a low power or inactive state, and activated only when the first process already suggests that there is a high probability that the speech is the speech of the enrolled speaker. In some other embodiments, where the first voice biometric process is a suitably low power process, it can be used without using a voice activity detection block in the pre-processing block 80. In those embodiments, all frames (or all frames that are considered to contain a noticeable signal level) are output from the pre-processing block 80. This is applicable when the first voice biometric process is such that it is considered more preferable to run the first voice biometric process on the entire audio signal than to run a dedicated voice activity detector on the entire audio signal and then run the first voice biometric process on the frames of the audio signal that contain speech.

In some embodiments, the second voice biometric block 84 is activated when the first voice biometric process has completed, and has made a provisional or initial determination based on the whole of a speech segment that the speech might be the speech of the enrolled speaker.

In other embodiments, in order to reduce the latency of the system, the second voice biometric block 84 is activated before the first voice biometric process has completed. In those embodiments, the provisional or initial determination can be based on an initial part of a speech segment or alternatively can be based on a partial calculation relating to the whole of a speech segment. Further, in such cases, the second voice biometric block 84 is deactivated if the final determination by the first voice biometric process is that there is a relatively low probability the speech is the speech of the enrolled speaker.

For example, the first voice biometric process may be a voice biometric process selected from a group comprising: a process based on analysing a long-term spectrum of the speech, as described in UK Patent Application No. 1719734.4; a method using simple Gaussian Mixture Model (GMM); a method using Mel Frequency Cepstral Coefficients (MFCC); a method using Principal Component Analysis (PCA); a method using machine learning techniques such as Deep Neural Nets (DNNs); and a method using a Support Vector Machine (SVM), amongst others.

For example, the second voice biometric process may be a voice biometric process selected from a group comprising: a neural net (NN) process; a Joint Factor Analysis (JFA) process; a Tied Mixture of Factor Analyzers (TMFA); and an i-vector process, amongst others.

In some examples, the first voice biometric process may be configured as an analog processing biometric system, with the second voice biometric process configured as a digital processing biometric system.

Figure 6:
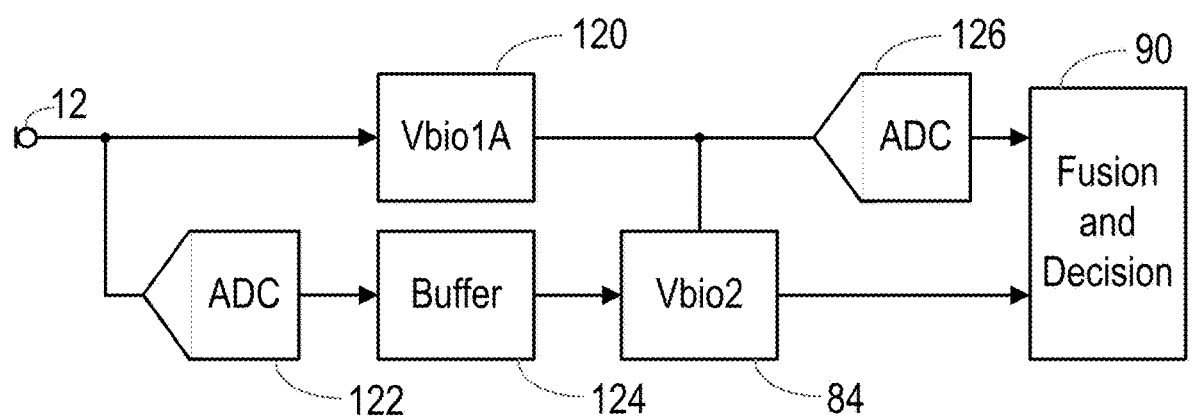
FIG. 6 is a block diagram illustrating an alternative system for analysing an audio signal.

FIG. 6 is a block diagram illustrating functional blocks in the analysis system in that case.

As in FIGS. 4 and 5, an audio signal, which is expected to contain speech, is generated by a microphone 12 in response to the detected sound.

As before, the audio signal may for example be expected to contain the speech of a specific speaker, who has previously enrolled in the speaker recognition system. In that case, the aim of the method may be to determine whether the person speaking is indeed the enrolled speaker, in order to determine whether any commands that are spoken by that person should be acted upon.

The signal generated by the microphone 12 is passed to a first voice biometric block, which in this embodiment is an analog processing circuit (Vbio1A) 120, that is a computing circuit constructed using resistors, inductors, op amps, etc. This performs a first voice biometric process on the audio signal. As is conventional for a voice biometric process, this attempts to identify, as in step 64 of the process shown in FIG. 3, whether the speech is the speech of an enrolled speaker.

If the first voice biometric process performed in the first voice biometric block 120 determines that the speech is not the speech of the enrolled speaker, the process ends. Any speech thereafter may be disregarded, until such time as there is evidence that a different person has started speaking.

Separately, the signal generated by the microphone 12 is passed to a pre-processing block, which includes at least an analog-digital converter (ADC) 122, for converting the signal into a digital form. The pre-processing block may also divide the received signal into frames, which may for example have lengths in the range of 10-100 ms.

The signal output from the pre-processing block including the analog-digital converter 122 is passed to a buffer 124, the output of which is connected to a second voice biometric block (Vbio2) 84. If the first voice biometric process makes a provisional or initial determination that the speech might be the speech of the enrolled speaker, the second voice biometric block 84 is activated, and the relevant part of the data stored in the buffer 124 is output to the second voice biometric block 84.

Then, a second voice biometric process is performed on the relevant part of the audio signal that was stored in the buffer 124. Again, this second biometric process attempts to identify whether the speech is the speech of an enrolled speaker.

The second voice biometric process is selected to be more discriminative than the first voice biometric process.

For example, the term "more discriminative" may mean that the second voice biometric process is configured to have a lower False Acceptance Rate (FAR), a lower False Rejection Rate (FRR), or a lower Equal Error Rate (EER) than the first voice biometric process.

The analog first voice biometric process will typically be a relatively low power process, compared to the second voice biometric process. This means that the first voice biometric process can be running on all signals that are considered to contain a noticeable signal level, without the need for a separate voice activity detector.

As mentioned above, in some embodiments, the second voice biometric block 84 is activated when the first voice biometric process has completed, and has made a provisional or initial determination based on the whole of a speech segment that the speech might be the speech of the enrolled speaker. In other embodiments, in order to reduce the latency of the system, the second voice biometric block 84 is activated before the first voice biometric process has completed. In those embodiments, the provisional or initial determination can be based on an initial part of a speech segment or alternatively can be based on a partial calculation relating to the whole of a speech segment. Further, in such cases, the second voice biometric block 84 is deactivated if the final determination by the first voice biometric process is that there is a relatively low probability the speech is the speech of the enrolled speaker.

For example, the second voice biometric process may be a voice biometric process selected from a group comprising: a neural net (NN) process; a Joint Factor Analysis (JFA) process; a Tied Mixture of Factor Analyzers (TMFA); and an i-vector process, amongst others.

As described above with reference to FIGS. 4, 5 and 6, the first voice biometric process makes an initial attempt to identify whether the speech is the speech of the enrolled speaker. If that process determines that there is a sufficiently high probability that the speech is the speech of the enrolled speaker, the second voice biometric process makes an attempt to identify whether the speech is the speech of the enrolled speaker.

As shown in FIG. 4, one possibility is that the output from the second voice biometric process 84 is passed to a decision block 86, which decides whether to accept that the speech is the speech of the enrolled speaker. For example, the second voice biometric process 84 may generate a likelihood score, and the decision block 86 may compare this with a threshold value, with that threshold value potentially being set based on a required security level. Thus, in a low security application, the threshold value may be set to be low, ensuring a low False Rejection Rate but with an increased False Acceptance Rate. In a higher security application, the threshold value may be set to be high, ensuring a low False Acceptance Rate, but with an increased False Rejection Rate. As noted above, however, the second voice biometric process 84 may be a relatively computationally expensive process, so that in any event the combination of the False Acceptance Rate and the False Rejection Rate (or the Equal Error Rate) is better than can be obtained from the first voice biometric process.

As shown in FIGS. 5 and 6, an alternative possibility is that the outputs from the first voice biometric process 82 and from the second voice biometric process 84, 120 are both passed to a fusion and decision block 90. In the case of the embodiment shown in FIG. 6, depending on the form of the result signal that is output from the analog computing process 120, this signal may be passed to an analog-digital converter (ADC) 126 to put the signal into a digital form before passing it to the fusion and decision block 90. The fusion and decision block 90 combines the scores from the two processes and decides whether to accept that the speech is the speech of the enrolled speaker.

For example, with a score $S_1$ generated by the first voice biometric process 82 and a score $S_2$ generated by the second voice biometric process, the combined score $S_T$ may be a weighted sum of these two scores, i.e.:

$$S_T = \alpha S_1 + (1-\alpha) S_2.$$

Alternatively, the fusion and decision block 90 may combine the decisions from the two processes and decide whether to accept that the speech is the speech of the enrolled speaker.

For example, with a score $S_1$ generated by the first voice biometric process 82 and a score $S_2$ generated by the second voice biometric process, it is determined whether $S_1$ exceeds a first threshold th1 that is relevant to the first voice biometric process 82 and whether $S_2$ exceeds a second threshold th2 that is relevant to the second voice biometric process. The fusion and decision block 90 may then decide to accept that the speech is the speech of the enrolled speaker if both of the scores exceed the respective threshold.

Combining the results of the two biometric processes means that the decision can be based on more information, and so it is possible to achieve a lower Equal Error Rate than could be achieved using either process separately.

As noted above, the first and second voice biometric processes may both be performed in a device such as the smartphone 10. However, in other examples, the first and second voice biometric processes may be performed in separate devices.

Figure 7:
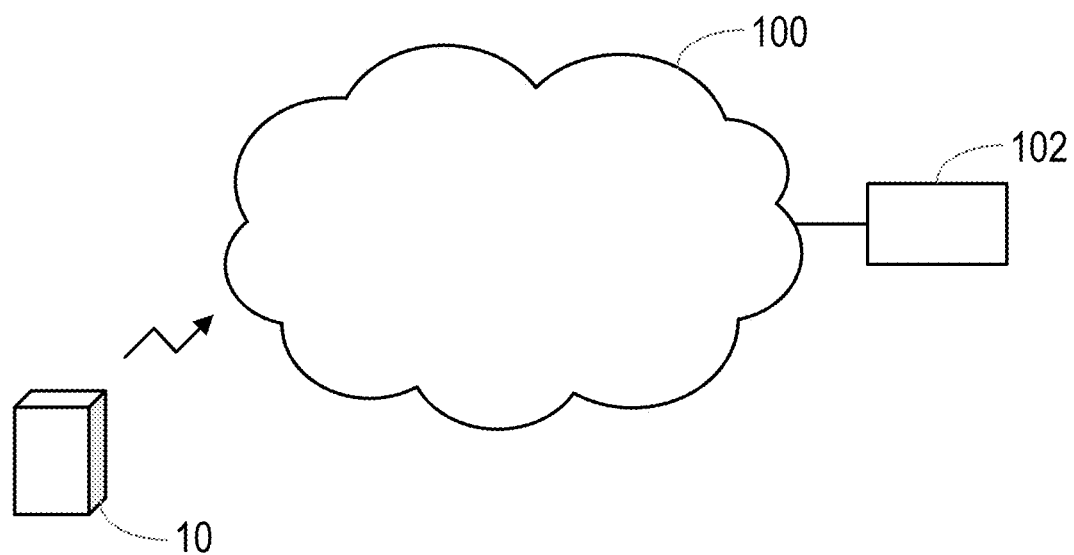
FIG. 7 illustrates a use of the method of FIG. 3.

For example, as shown in FIG. 7, the first voice biometric processes may be performed in a device such as the smartphone 10. Then, the received audio signal may be transmitted over a network 100 to a remote device (for example a cloud-based biometric processor 102) using the transceiver 18 only in the event that the first voice biometric process has made a provisional or initial determination that the speech might be the speech of the enrolled speaker. The second voice biometric processes may then be performed in the remote device 102.

Figure 8:
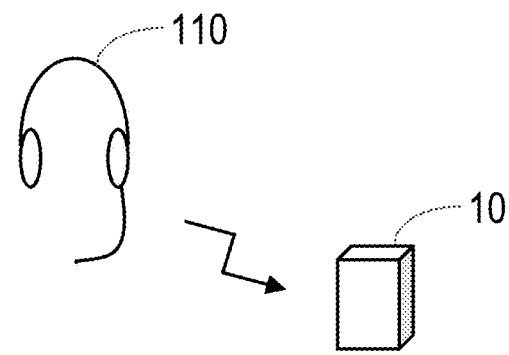
FIG. 8 illustrates a second use of the method of FIG. 3.

As another example, as shown in FIG. 8, an accessory such as a headset 110 or other listening device such as a pair of earbuds, may be in use in conjunction with a device such as the smartphone 10. In that case, the first voice biometric processes may be performed in the accessory device such as the headset 110. Then, the received audio signal may be transmitted to the smartphone 10 only in the event that the first voice biometric process has made a provisional or initial determination that the speech might be the speech of the enrolled speaker. The second voice biometric processes may then be performed in the smartphone 10. Thus, wireless transmission circuitry in the accessory device may be activated, to transmit data to the host device, only when it is determined in the accessory device that the speech might be that of the enrolled speaker.

In addition, even when the first and second voice biometric processes are both performed in a device such as the smartphone 10, they may be performed in separate integrated circuits.

Figure 9:
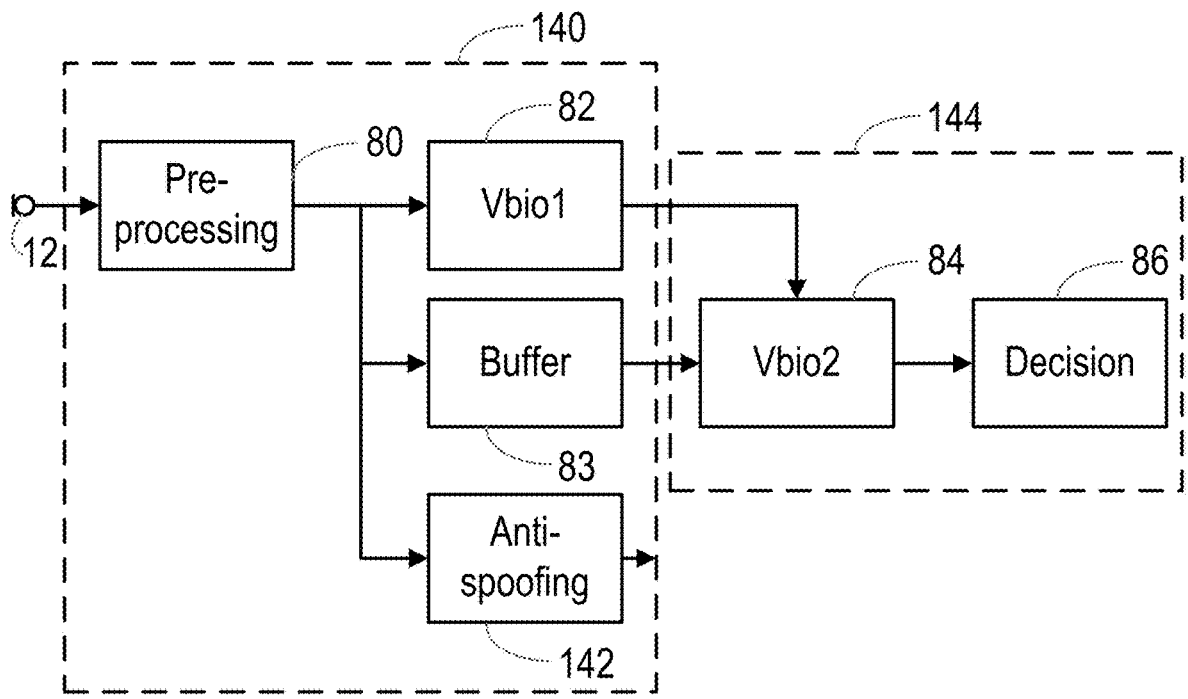
FIG. 9 is a block diagram illustrating a further system for analysing an audio signal.

FIG. 9 shows one example of this. FIG. 9 corresponds generally to FIG. 4, but shows that the pre-processing block 80, the first voice biometric process 82, and the buffer 83 are provided on a first integrated circuit 140, for example a dedicated low-power biometrics chip. This may operate in an "always on" manner, such that all received signals are passed to the first biometric process 82. In that case, the first biometric process 82 may act as a voice activity detector. Alternatively, the first biometric process 82 may be activated in response to a voice activity detector (either within the pre-processing block 80 or separate from the first integrated circuit 140) determining that the signal contains speech.

In addition, the first integrated circuit 140 may contain an anti-spoofing block 142, for performing one or more tests on the received signal to determine whether the received signal has properties that may indicate that it results not from the user speaking into the device, but from a replay attack where a recording of the enrolled user's voice is used to try and gain illicit access to the system. If the output of the anti-spoofing block 142 indicates that the received signal may result from a replay attack, then this output may be used to prevent the second voice biometric process being activated, or may be passed to the decision block 86 for its use in making its decision on whether to act on the spoken input.

Meanwhile, the second voice biometric process 84 and the decision block 86 are provided on a second integrated circuit 144, for example a high-power, high-performance chip, such as the applications processor of the smartphone.

Figure 10:
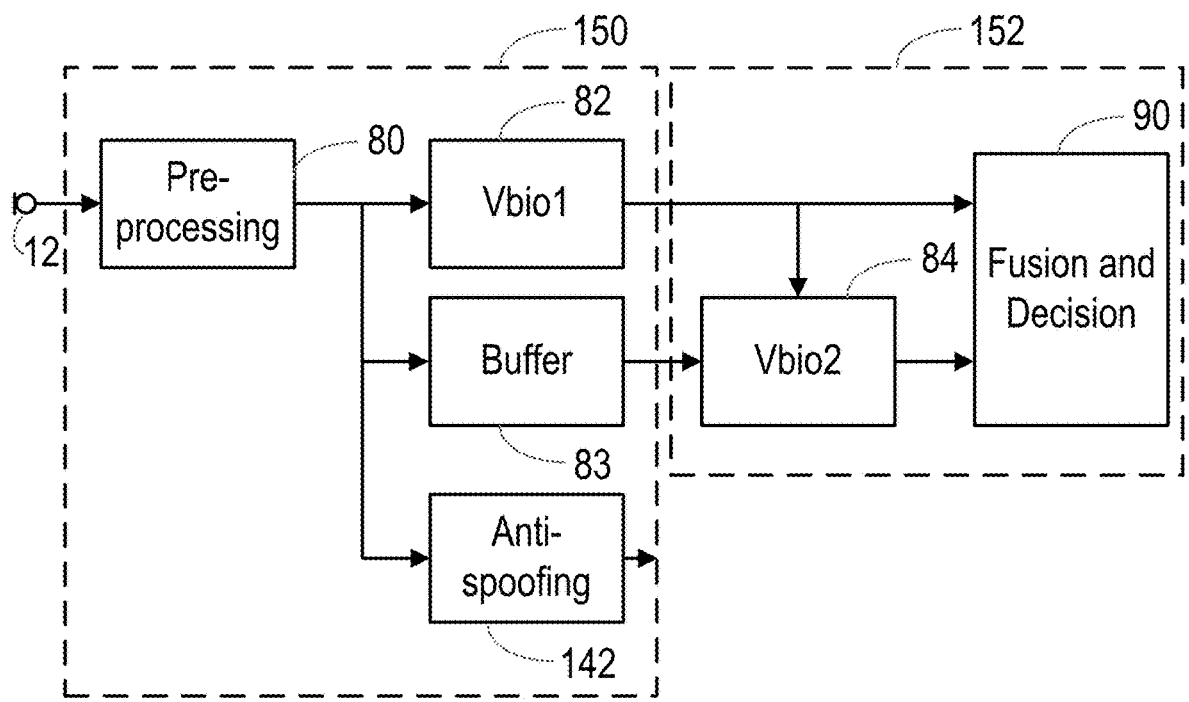
FIG. 10 is a block diagram illustrating a further system for analysing an audio signal.

FIG. 10 shows another example of this. FIG. 10 corresponds generally to FIG. 5, but shows that the pre-processing block 80, the first voice biometric process 82, and the buffer 83 are provided on a first integrated circuit 150, for example a dedicated low-power biometrics chip. This may operate in an "always on" manner, such that all received signals are passed to the first biometric process 82. In that case, the first biometric process 82 may act as a voice activity detector. Alternatively, the first biometric process 82 may be activated in response to a voice activity detector (either within the pre-processing block 80 or separate from the first integrated circuit 150) determining that the signal contains speech.

In addition, the first integrated circuit 150 may contain an anti-spoofing block 142, for performing one or more tests on the received signal to determine whether the received signal has properties that may indicate that it results not from the user speaking into the device, but from a replay attack where a recording of the enrolled user's voice is used to try and gain illicit access to the system. If the output of the anti-spoofing block 142 indicates that the received signal may result from a replay attack, then this output may be used to prevent the second voice biometric process being activated, or may be passed to the fusion and decision block 90 for its use in making its decision on whether to act on the spoken input.

Meanwhile, the second voice biometric process 84 and the fusion and decision block 90 are provided on a second integrated circuit 152, for example a high-power, high-performance chip, such as the applications processor of the smartphone.

Figure 11:
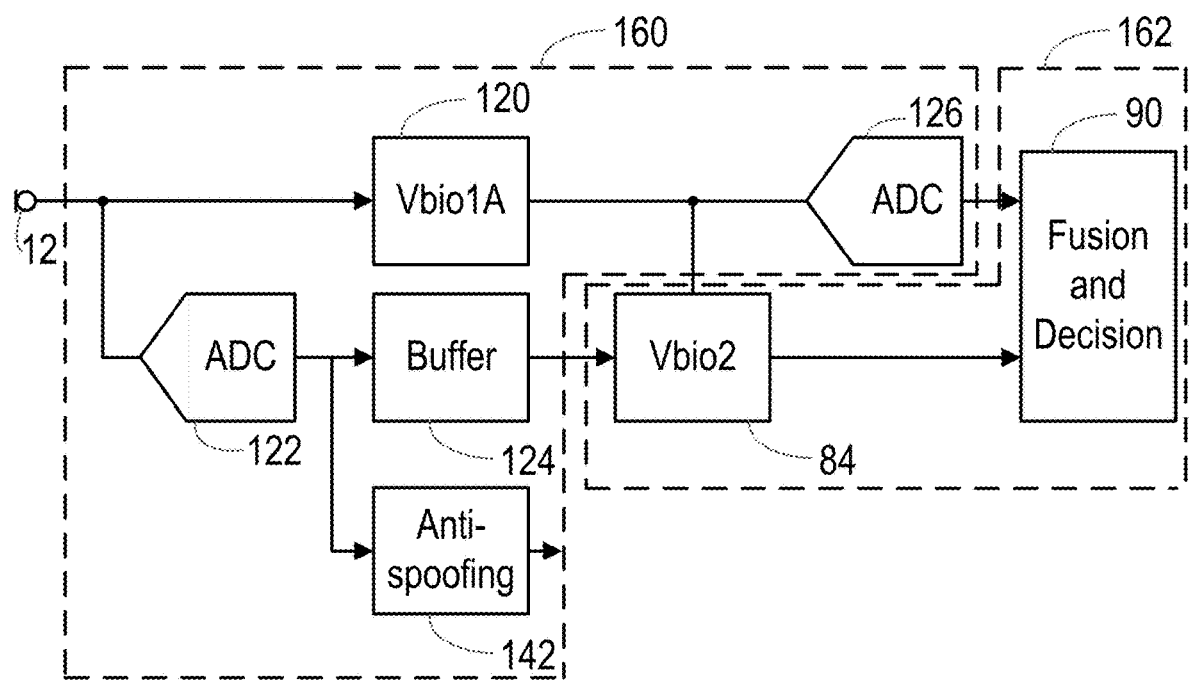
FIG. 11 is a block diagram illustrating a further system for analysing an audio signal.

FIG. 11 shows another example of this division of the functionality. FIG. 11 corresponds generally to FIG. 6, but shows that the analog first voice biometric process 120, the analog-digital converters (ADCs) 122, 126, and the buffer 124 are provided on a first integrated circuit 160, for example a dedicated low-power biometrics chip. This may operate in an "always on" manner, such that all received signals are passed to the analog first biometric process 120. In that case, the first biometric process 120 may act as a voice activity detector.

In addition, the first integrated circuit 160 may contain an anti-spoofing block 142, for performing one or more tests on the received signal to determine whether the received signal has properties that may indicate that it results not from the user speaking into the device, but from a replay attack where a recording of the enrolled user's voice is used to try and gain illicit access to the system. If the output of the anti-spoofing block 142 indicates that the received signal may result from a replay attack, then this output may be used to prevent the second voice biometric process being activated, or may be passed to the fusion and decision block 90 for its use in making its decision on whether to act on the spoken input.

Meanwhile, the second voice biometric process 84 and the fusion and decision block 90 are provided on a second integrated circuit 162, for example a high-power, high-performance chip, such as the applications processor of the smartphone.

It was mentioned above in connection with FIGS. 9 and 10 that the first biometric process 82 may act as a voice activity detector. Similarly, it was mentioned in connection with FIG. 11 that the first biometric process 120 may act as a voice activity detector. A voice biometric can be used as a voice activity detector because there is a similarity between the processes. A voice biometric process typically compares features extracted from the received speech against a voiceprint that is made of features extracted from the enrolled user's speech. If the similarity score exceeds a particular threshold, meaning that the degree of similarity is high enough, then the received speech is considered to be that of the enrolled user. If it is determined by the first voice biometric process that the speech is the speech of an enrolled user, this can be used as an indication that the received audio signal comprises speech.

The similarity score can also be compared with a lower threshold. If the similarity score exceeds that lower threshold, then this will typically be insufficient to say that the received signal contains the speech of the enrolled user, but it will be possible to say that the received signal does contain speech.

Similarly, it may be possible to determine that the received signal does contain speech, before it is possible to determine with any certainty that the received signal contains the speech of the enrolled user. For example, in the case where the first voice biometric process is based on analysing a long-term spectrum of the speech, it may be necessary to look at, say, 100 frames of the signal in order to obtain a statistically robust spectrum, that can be used to determine whether the specific features of that spectrum are characteristic of the particular enrolled speaker. However, it may already be possible after a much smaller number of samples, for example 10-20 frames, to determine that the spectrum is that of human speech rather than of a noise source, a mechanical sound, or the like.

Thus, in this case, while the first voice biometric process is being performed, an intermediate output can be generated and used as a voice activity detection signal. This can be supplied to any other processing block in the system, for example to control whether a speech recognition process should be enabled.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of speaker identification, performed in a portable electronic device, wherein the portable electronic device comprises first and second integrated circuits, the method comprising:
receiving an audio signal representing speech;
performing a first voice biometric process on the audio signal in said first integrated circuit of said portable electronic device to attempt to identify whether the speech is the speech of an enrolled speaker; and
if the first voice biometric process makes an initial determination that the speech is the speech of an enrolled user, performing a second voice biometric process on the audio signal in said second integrated circuit of said portable electronic device to attempt to identify whether the speech is the speech of the enrolled speaker,
wherein the second voice biometric process is selected to be more discriminative than the first voice biometric process, and
wherein the first voice biometric process is selected to be relatively low-power compared to the second voice biometric process and wherein the first integrated circuit is configured to perform the first biometric process using relatively less power than the second integrated circuit performing the second voice biometric process.

2. A method according to claim 1, wherein the second voice biometric process is configured to have a lower Equal Error Rate than the first voice biometric process.

3. A method according to claim 1, comprising making a decision as to whether the speech is the speech of the enrolled speaker, based on a result of the second voice biometric process.

4. A method according to claim 1, comprising making a decision as to whether the speech is the speech of the enrolled speaker, based on a fusion of a result of the first voice biometric process and a result of the second voice biometric process.

5. A method according to claim 1, wherein the first voice biometric process is selected from the following: a process based on analysing a long-term spectrum of the speech; a method using a Gaussian Mixture Model; a method using Mel Frequency Cepstral Coefficients; a method using Principal Component Analysis; a method using machine learning techniques such as Deep Neural Nets (DNNs); and a method using a Support Vector Machine.

6. A method according to claim 1, wherein the second voice biometric process is selected from the following: a neural net process, a Joint Factor Analysis process; a Tied Mixture of Factor Analyzers process; and an i-vector process.

7. A method according to claim 1, comprising maintaining the second voice biometric process in a low power state, and activating the second voice biometric process if the first voice biometric process makes an initial determination that the speech is the speech of an enrolled user.

8. A method according to claim 1, comprising activating the second voice biometric process in response to an initial determination based on a partial completion of the first voice biometric process that the speech might be the speech of an enrolled user, and deactivating the second voice biometric process in response to a determination based on a completion of the first voice biometric process that the speech is not the speech of the enrolled user.

9. A method according to claim 1, comprising:
detecting a trigger phrase in the received audio signal; and
responsive to the detecting of the trigger phrase, performing the first voice biometric process on the received audio signal.

10. A method according to claim 1, comprising:
detecting voice activity in the received audio signal; and
responsive to the detecting of voice activity, performing the first voice biometric process on at least a part of the received audio signal.

11. A method according to claim 1, comprising:
detecting voice activity in the received audio signal;
responsive to the detecting of voice activity, performing keyword detection; and
responsive to detecting a keyword, performing the first voice biometric process on at least a part of the received audio signal.

12. A method according to claim 1, comprising:
performing the first voice biometric process on the entire received audio signal.

13. A method according to claim 1, comprising using an initial determination by the first voice biometric process, that the speech is the speech of an enrolled user, as an indication that the received audio signal comprises speech.

14. A method according to claim 1, comprising:
performing at least a part of a voice biometric process suitable for determining whether a signal contains speech of an enrolled user, and generating an output signal when it is determined that the signal contains human speech.

15. A method according to claim 14, comprising comparing a similarity score with a first threshold to determine whether the signal contains speech of an enrolled user, and comparing the similarity score with a second, lower, threshold to determine whether the signal contains speech.

16. A method according to claim 14, comprising determining that the signal contains human speech before it is possible to determine whether the signal contains speech of an enrolled user.

17. A method according to claim 1, wherein the first voice biometric process is configured as an analog processing system, and the second voice biometric process is configured as a digital processing system.

18. A speaker identification system, performed in a portable electronic device, wherein the portable electronic device comprises first and second integrated circuits, the system comprising:
an input for receiving an audio signal representing speech;
a first processor for performing a first voice biometric process on the audio signal in said first integrated circuit of said portable electronic device to attempt to identify whether the speech is the speech of an enrolled speaker; and
a second processor for performing a second voice biometric process on the audio signal in said second integrated circuit of said portable electronic device to attempt to identify whether the speech is the speech of the enrolled speaker, wherein the second voice biometric process is initiated if the first voice biometric process makes an initial determination that the speech is the speech of an enrolled user, wherein the second voice biometric process is selected to be more discriminative than the first voice biometric process, and wherein the first voice biometric process is selected to be relatively low-power compared to the second voice biometric process and wherein the first integrated circuit is configured to perform the first biometric process using relatively less power than the second integrated circuit performing the second voice biometric process.

19. A speaker identification system according to claim 18, further comprising:

a buffer, for storing the received audio signal, and for supplying the stored received audio signal to the second voice biometric process if the first voice biometric process makes an initial determination that the speech is the speech of an enrolled user.

20. A speaker identification system according to claim 18, comprising:

a first device; and a second device, wherein the first device includes the first processor, and the second device includes the second processor.

* * * * *